US012719830B2

(12) United States Patent
Sam

(10) Patent No.: US 12,719,830 B2
(45) Date of Patent: Aug. 25, 2026

(54) EXPORTING NETWORK FLOW INFORMATION RECORDS USING NETWORK STORAGE

(71) Applicant: Arista Networks, Inc., Santa Clara, CA (US)

(72) Inventor: Dennis Sam, Vancouver (CA)

(73) Assignee: Arista Networks, Inc., Santa Clara, CA (US)

( * ) Notice: Subject to any disclaimer, the term of this patent is extended or adjusted under 35 U.S.C. 154(b) by 7 days.

(21) Appl. No.: 18/819,657

(22) Filed: Aug. 29, 2024

(65) Prior Publication Data

US 2026/0067250 A1 Mar. 5, 2026

(51) Int. Cl.
*H04L 9/40* (2022.01)

(52) U.S. Cl.
CPC ................................ *H04L 63/0227* (2013.01)

(58) Field of Classification Search
CPC ............... H04L 63/0227; G06F 16/113; G06F 16/1844; G06F 16/27
See application file for complete search history.

(56) References Cited

U.S. PATENT DOCUMENTS 7,120,931 B1 * 10/2006 Cheriton ............ H04L 63/0227 726/13
7,788,371 B2 * 8/2010 Claise ................ H04L 41/0213 709/224
8,331,234 B1 * 12/2012 Newton ................. H04L 43/04 370/231
8,582,428 B1 * 11/2013 Bishara ................ H04L 43/022 370/229
9,461,912 B2 * 10/2016 Varga .................... H04L 43/028
10,367,703 B2 * 7/2019 Gibson .............. H04L 63/0263
10,594,576 B2 * 3/2020 Cavuto ................. H04L 43/045
10,623,424 B2 * 4/2020 Holeman ............. H04L 67/568
10,708,285 B2 * 7/2020 Holeman ............... H04L 43/02
11,146,468 B1 * 10/2021 Chandrasekaran ..... H04L 43/02
11,196,636 B2 * 12/2021 Rieke .................... H04L 63/101
(Continued)

OTHER PUBLICATIONS

RFC3954, Cisco Systems NetFlow Services Export Version 9, Network Working Group, Oct. 2004.*
(Continued)

*Primary Examiner* — David Garcia Cervetti
(74) *Attorney, Agent, or Firm* — Amsel IP Law PLLC; Jason Amsel

(57) ABSTRACT

A network device exports network flow information records. The network device obtains network traffic data sent to the network device. The network device generates network flow information records characterizing the network traffic data and including information relating to firewall policies applied by the network device. The network device stores the network flow information records to a local storage of the network device. At a scheduled refresh time, the network device uploads a set of the network flow information records over a network to a remote network storage for archiving in a database accessible to a network monitoring appliance. The network device may include an optional streaming mode. While the streaming mode is enabled, the network device streams the network flow information records to the network monitoring appliance over a network.

20 Claims, 5 Drawing Sheets

(56) References Cited

U.S. PATENT DOCUMENTS 11,469,986 B2* 10/2022 Nazar ..................... H04L 43/50
11,516,302 B2* 11/2022 Machikoppa ....... H04L 61/4541
2001/0039579 A1* 11/2001 Trcka .................... G06F 21/552 709/224
2003/0135525 A1* 7/2003 Huntington ............. H04L 41/22 715/202
2003/0135612 A1* 7/2003 Huntington ........... H04L 69/164 709/224
2007/0217425 A1* 9/2007 Claise ................. H04L 41/0213 370/392
2007/0248029 A1* 10/2007 Merkey ................. H04L 67/561 370/255
2008/0115190 A1* 5/2008 Aaron ................. H04L 63/0272 726/1
2008/0222532 A1* 9/2008 Mester .................. H04L 63/145 726/25
2010/0165859 A1* 7/2010 Carruzzo .............. H04L 43/026 370/252
2010/0169719 A1* 7/2010 Carruzzo .............. H04L 43/026 709/224
2010/0195538 A1* 8/2010 Merkey ................... H04L 43/02 370/255
2010/0226282 A1* 9/2010 Aitken .................. H04L 43/026 370/254
2013/0041934 A1* 2/2013 Annamalaisami ...... H04L 43/04 709/203
2013/0097658 A1* 4/2013 Cooper ............... H04L 63/0227 726/1
2013/0097692 A1* 4/2013 Cooper ................... H04L 63/10 726/14
2013/0114612 A1* 5/2013 Singh ...................... H04L 43/04 370/400
2014/0086069 A1* 3/2014 Frey ...................... H04L 43/045 370/252
2014/0136680 A1* 5/2014 Joshi ..................... H04L 43/026 709/224
2014/0219086 A1* 8/2014 Cantu' ................ H04L 12/4641 370/231
2014/0303934 A1* 10/2014 Mylarappa .......... G06F 11/3089 702/186
2014/0304393 A1* 10/2014 Annamalaisami .. G06F 11/3495 709/224
2014/0321278 A1* 10/2014 Cafarelli ................. H04L 43/12 370/235
2014/0365676 A1* 12/2014 Yoakum .................. H04L 65/70 709/231
2015/0113588 A1* 4/2015 Wing .................. H04L 63/0227 726/1
2015/0215183 A1* 7/2015 Bucci ...................... H04L 45/02 370/252
2015/0229661 A1* 8/2015 Balabine ............. H04L 63/1425 726/22
2015/0326454 A1* 11/2015 Geis .................... H04L 67/1036 709/226
2016/0248813 A1* 8/2016 Bymes ................ H04L 63/0227
2016/0294663 A1* 10/2016 Veres ...................... H04L 41/22
2016/0301609 A1* 10/2016 Veres .................. H04L 43/0888
2017/0118237 A1* 4/2017 Devi Reddy ............ G06N 5/02
2017/0142066 A1* 5/2017 Li .......................... H04L 47/10
2017/0195255 A1* 7/2017 Pham ...................... H04L 43/20
2017/0214703 A1* 7/2017 Tekchandani ....... H04L 63/1425
2017/0237760 A1* 8/2017 Holeman .............. H04L 43/026 726/22
2018/0069865 A1* 3/2018 Rieke .................... H04L 43/045
2018/0131675 A1* 5/2018 Sengupta ............ H04L 63/0245
2018/0176183 A1* 6/2018 Shah ................... H04L 63/0254
2018/0176184 A1* 6/2018 Bansal .................... H03M 7/30
2018/0176255 A1* 6/2018 Bansal ................ H04L 41/0895
2018/0191767 A1* 7/2018 Habib ................. H04L 63/1425
2019/0075056 A1* 3/2019 Lu ....................... H04L 63/1425
2019/0182294 A1* 6/2019 Rieke .................. H04L 63/1433
2020/0099630 A1* 3/2020 Stolarchuk .............. H04L 47/80
2021/0083941 A1* 3/2021 Mutnuru ............. H04L 47/2483
2021/0266244 A1* 8/2021 Haga ..................... G06F 21/554
2021/0328939 A1* 10/2021 Munukutla ............. H04L 45/28
2021/0328940 A1* 10/2021 Patki ....................... H04L 45/50
2021/0367903 A1* 11/2021 Stolarchuk .............. H04L 43/12
2022/0224654 A1* 7/2022 Munukutla ......... H04L 43/0829
2022/0337555 A1* 10/2022 Gol ..................... H04L 63/0236
2023/0042469 A1* 2/2023 Hilgenkamp ....... H04L 63/0263
2023/0318958 A1* 10/2023 Mehta ..................... H04L 43/04 709/224
2024/0137302 A1* 4/2024 Ratanatharathorn ........................ H04L 63/1441
2024/0340636 A1* 10/2024 Mas Rosique ........ H04W 12/72
2025/0247284 A1* 7/2025 Mortha ............... H04L 41/5009
2026/0067250 A1* 3/2026 Sam .................... H04L 63/0227

OTHER PUBLICATIONS

RFC5101, Specification of the IP Flow Information Export (IPFIX) Protocol for the Exchange of IP Traffic Flow Information, Network Working Group, Jan. 2008.*

Guarnieri et al., Information-Flow Control for Database-backed Applications, IEEE, 2019.*

Hofstede et al., Flow Monitoring Explained: From Packet Capture to Data Analysis With NetFlow and IPFIX, IEEE, 2014.*

Munz, Gerhard, and Georg Carle. "Real-time analysis of flow data for network attack detection." 2007 10th IFIP/IEEE International Symposium on Integrated Network Management. IEEE, 2007.*

* cited by examiner

EXPORTING NETWORK FLOW INFORMATION RECORDS USING NETWORK STORAGE

BACKGROUND

Network devices such as switches, routers, and firewall devices can receive significant volumes of network traffic data and generate corresponding network flow information records. Such information records may be formatted into various exportable formats such as Internet Protocol Flow Information eXport (IPFIX) records, sampled flow (sFlow) records, or other record formats. These records may then be transferred over a network to a remote network monitoring appliance for purposes of monitoring network performance, assessing security risks, debugging, managing network devices, or other network administrative functions. In large data centers, network devices can often generate and export records at a rate faster than they can be processed by the network monitoring appliance. As a result, records may be dropped by the network monitoring appliance and/or the exporting devices may be configured to send less than a complete set of records. Such loss of data may be unacceptable in environments where the integrity of network flow information records is required for auditing or other purposes.

BRIEF DESCRIPTION OF THE DRAWINGS

The teachings of the embodiments herein can be readily understood by considering the following detailed description in conjunction with the accompanying drawings.

DETAILED DESCRIPTION

A network device (e.g., a firewall device or top-of-rack (ToR) device) obtains network traffic data sent to the network device and generates network flow information records associated with data center operations, operation of a distributed firewall system, or other network operations. In an archiving mode, the network device stores the records to a local storage of the network device. Records are then uploaded to a remote (e.g., cloud) storage at a scheduled refresh interval. The remote storage can be accessed by a network monitoring appliance that queries the remote storage to obtain network flow information records on-demand. The network device can buffer the network flow information records locally and archive them to the network storage at least as fast as the records are generated, thereby avoiding data loss and preserving data integrity.

The network device is also configurable in a streaming mode in which the network flow information records are streamed directly to the network monitoring appliance. In the streaming path, the network device prioritizes real-time availability over completeness of records. The streaming mode can operate concurrently with the archival mode when enabled.

The network monitoring appliance obtains the network flow information records through the streaming path, retrieves archived records from the remote storage, or both. The network monitoring appliance can perform various processing functions on the network flow information records such as aggregation, filtering, and/or other analytics. The network monitoring appliance may then output the records and analytical data for presentation via a user interface of an administrative console. The network monitoring appliance may operate in conjunction with a network environment that may include any number of network devices exporting network flow information records. The network environment is highly scalable and robust to varying network conditions, enabling capture of network flow information records from any devices without data loss.

Figure 1:
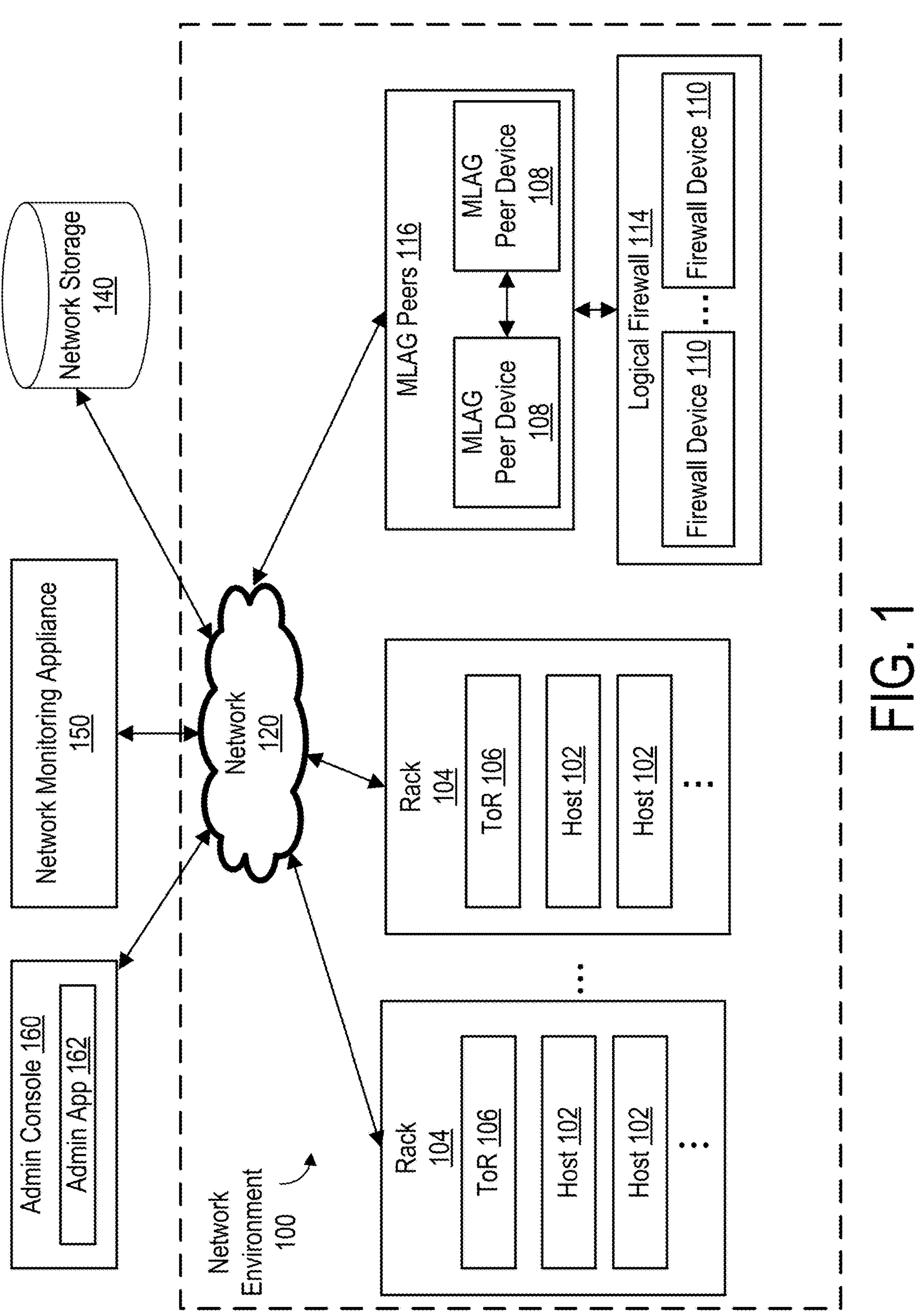
FIG. 1 illustrates an example of a network environment in which a set of network devices export network flow information records relating to the operation of a distributed firewall system.

FIG. 1 illustrates an example computer network environment 100. In this example, the computer network environment 100 comprises a data center environment that includes a distributed firewall system. A set of host devices 102 perform general processing and/or storage functions and may communicate via the network 120. The host devices 102 may be organized into respective racks 104, which are each managed by a respective top of rack (ToR) device 106 coupled to each of the host devices 102 in the rack 104. The ToR device 106 switches network traffic between the host devices 102 within the rack 104 and between the host devices 102 and the network 120. Traffic over the network 120 may include traffic between host devices 102 in different racks 104 or between host devices 102 and external gateways coupled to the network 120.

The ToR devices 106 may furthermore enforce firewall policies with respect to traffic through the ToR devices 106. These policies may control whether the ToR device 106 allows, blocks, or redirects network traffic dependent on observed characteristics of the network traffic and the firewall policy configuration. The firewall policies may include policies controlling communications between two or more host devices 102 in the network environment 100 (i.e., "east-west" traffic) and may include policies controlling communications between the host devices 102 and external devices coupled to the network 120 (i.e., "north-south"traffic).

The computer network environment 100 also includes a logical firewall 114 (comprising one or more firewall devices 110) managed by a Multi-Chassis Link Aggregation (MLAG) pair 116 (e.g., comprising MLAG peer devices 108). The firewall devices 110 may logically operate like a single firewall. Each traffic flow is forwarded to the logical firewall 114 and is distributed to one of the firewall devices 110 to apply firewall policy. The MLAG peer devices 108 (e.g., switches) operate cooperatively to support the logical firewall 114 by managing traffic to and from the firewall devices 110. For example, the MLAG pair 116 may perform functions such as load balancing flows across the firewall devices and ensuring that a traffic flow is consistently distributed to the same firewall device 110. The MLAG devices 108 may communicate with each other via a peer-to-peer link to coordinate their operation. The logical firewall 114 can scale horizontally through addition of firewall devices 110. Some network environments 100 may include two or more MLAG pairs 116 that may manage separate logical firewalls 114.

In one implementation, only certain types of firewall policies are directly enforced by the ToR devices 106, while other policies may be enforced by the logical firewall 114. For example, enforcement by the ToR devices 106 may be limited to stateless firewall policies. Traffic subject to more detailed inspection may be redirected by the ToR devices 106 to the logical firewall 114, which may apply other types of inspection and policy enforcement, including enforcement of stateful firewall policies. For example, the ToR devices 106 may be programmed with policies that redirect traffic associated with certain subnets to the logical firewall 114 while other traffic is inspected locally.

The network 120 may include a local area network (LAN), one or more wide area networks (WAN), or a combination thereof. For example, the network 120 may include a LAN that locally couples the racks 104 and service MLAG devices 108 within the network environment 100. The network monitoring appliance 150, administrative console 160, and network storage may also be part of the LAN (e.g., in an on-premise enterprise data center), or may be coupled via a WAN (e.g., the Internet).

In an example network environment 100, there may be hundreds or thousands of ToR devices 106. The network environment 100 may include a relatively smaller number of firewall devices 110. In other examples, the network environment 100 may include any number of ToR devices 106 and any number of firewall devices 110.

In the above-described network environment 100, the ToR devices 106 and the firewall devices 110 capture significant volumes of information about network traffic flows. Each flow represents a set of communications occurring in a connection between two endpoints (e.g., between two host devices 102 or between a host device 102 and an external gateway on the network 120). Packets within a flow typically share various common properties such as source and destination addresses, source and destination ports, protocol type, etc. This network flow data may be compiled into network flow information records in a standardized format and may be transmitted externally to a network monitoring appliance 150 for functions such as logging, monitoring, troubleshooting, security, general analytics, or other applications. One example of a flow record format is Internet Protocol Flow Information Export (IPFIX) records. Another example of flow records are Sampled Flow (sFlow) records, which are collected using statistical sampling techniques that capture packet data and provide visibility into network activity. The ToR devices 106 and firewall devices 110 may alternatively generate other types of network flow information records that may include varying types of information and varying data formats.

In the context of a distributed firewall system like the computer network environment 100 of FIG. 1, the network flow information records may include information about operation of the logical firewall 114, such as information describing occurrences of policy rules applied to traffic flows, information describing which policy rules were triggered, information about which e ToR device 106 or firewall device 110 applied the rule, information indicating whether flows were allowed or denied based on firewall policy, and/or other firewall-related information. The network flow information records may furthermore capture general flow information such as when flows start and end, source and destination addresses, etc.

The ToR devices 106 and firewall devices 110 of the network environment 100 each include logic for exporting flow information records (such as IPFIX, sFlow, or other types of records). The ToR devices 106 and firewall devices 110 may each operate according to two different operational modes: an archiving mode designed to archive network flow information records to a network storage 140, and a streaming mode designed to stream network flow information records to the network monitoring appliance 150 for low latency (e.g., real-time or near real-time) monitoring and/or analytics. The archiving mode operates to prioritize data integrity while potentially sacrificing some real-time availability of the network flow information records. Archiving in this manner can meet auditing requirements associated with the network environment 100 and may also be desirable for analytics or other purposes. In contrast, the streaming mode operates to prioritize data availability while potentially sacrificing data integrity. For example, under periods of high volume traffic, the streaming mode may drop or shorten some flow information records or aggregate flows in favor of maintaining a low latency data stream. The streaming mode may be desirable for tasks such as debugging, where real-time or near real-time data availability is desired over data integrity.

The archiving mode and the streaming mode may operate separately or may operate concurrently. In one usage scenario, the ToR devices 106 and firewall devices 110 may operate in the archiving mode as a default, and the streaming mode may be optionally concurrently enabled. This configuration ensures completeness of the archived network flow information records, while allowing streaming to be enabled on-demand, such as when real-time (or near real-time) monitoring and data analytics are desired. In other scenarios, both modes may be enabled by default. In yet further scenarios, the streaming mode could be enabled and the archiving mode may be disabled. Devices within a network environment 100 may be independently configurable such that different devices may operate in different operating modes dependent on their individual configurations. An example architecture and operations of a network device (such as a ToR device 106 or firewall device 110) with the above-described record archiving and streaming capabilities is described in further detail below with respect to FIG. 2.

The network storage 140 may comprise any on-premise storage, cloud storage, or a combination thereof. The network storage 140 may store the network flow information records in a database structure that can be queried by a query engine of the network monitoring appliance 150 (or another external system) to obtain records meeting search criteria. The network storage 140 may optionally be managed independently of the network environment 100 (e.g., by a third-party storage service separate from an enterprise managing the network environment 100). The records in the network storage 140 may optionally be made accessible to third-party analytics and/or logging services that may be managed independently of the network environment 100 and the network monitoring appliance 150.

The network monitoring appliance 150 receives the streaming network flow information records, when enabled, and may also access archived network flow information records from the network storage 140. For example, the network monitoring appliance 150 may generate various queries to obtain records from the network storage 140 according to specified search and/or filtering parameters. The network monitoring appliance 150 may process and output the records individually or in various aggregations.

The network monitoring appliance 150 may furthermore generate various analytical data based on the network flow information records that may be relevant to assessing network performance, security, management, or other network characteristics. Functions of the network monitoring appliance 150 may be implemented in hardware, software, firmware, or a combination thereof. Some functions of the network monitoring appliance may be implemented as a set of instructions that are stored to a non-transitory computer readable storage medium and executed by one or more processors. The network monitoring appliance 150 may execute on a single server or a collection of on-premise servers, or may execute in a cloud environment that may utilize distributed processing and storage technologies. An example of a network monitoring appliance 150 is described in further detail below with respect to FIG. 3.

The administrative console 160 comprises a computing device that executes an administrative application 162 and interfaces with the network monitoring appliance 150 to enable various user administration functions. For example, the administrative application 162 may present a user interface that enables an administrator to view network flow information records or analytical data derived therefrom, request records and/or analytics, or configure various settings of the network monitoring appliance 150 and/or the records management modules 212. The administrative application may optionally perform various analytical functions instead of, or in addition to those performed by the network monitoring appliance 150. The administrative console 160 may comprise a desktop computer, a laptop computer, a tablet, smartphone, or any other computing device. The administrative application 162 may execute locally on the administrative console 160 or may comprise a web-based application accessible via a browser. The administrative application 162 may be implemented as a set of instructions that are stored to a non-transitory computer readable storage medium and executed by one or more processors of the administrative console 160.

While FIG. 1 represents one example of a network environment 100,, other network environments 100 may include other network devices with similar capabilities for streaming and archiving network flow information records. For example, a network environment 100 may include one or more other network devices such as a network router, access point, hub, switch, repeater, modem, bridge, appliance, or any other network device that similarly generates and manages exportation of network flow information records. Moreover, a network environment 100 may include other types of data center environments that do not necessarily include a distributed firewall architecture, or that include a different firewall architecture than illustrated in FIG. 1. A suitable network environment may include any type of enterprise network environment, cloud computing and/or storage environment, or other computing environments that generate network flow information records.

Figure 2:
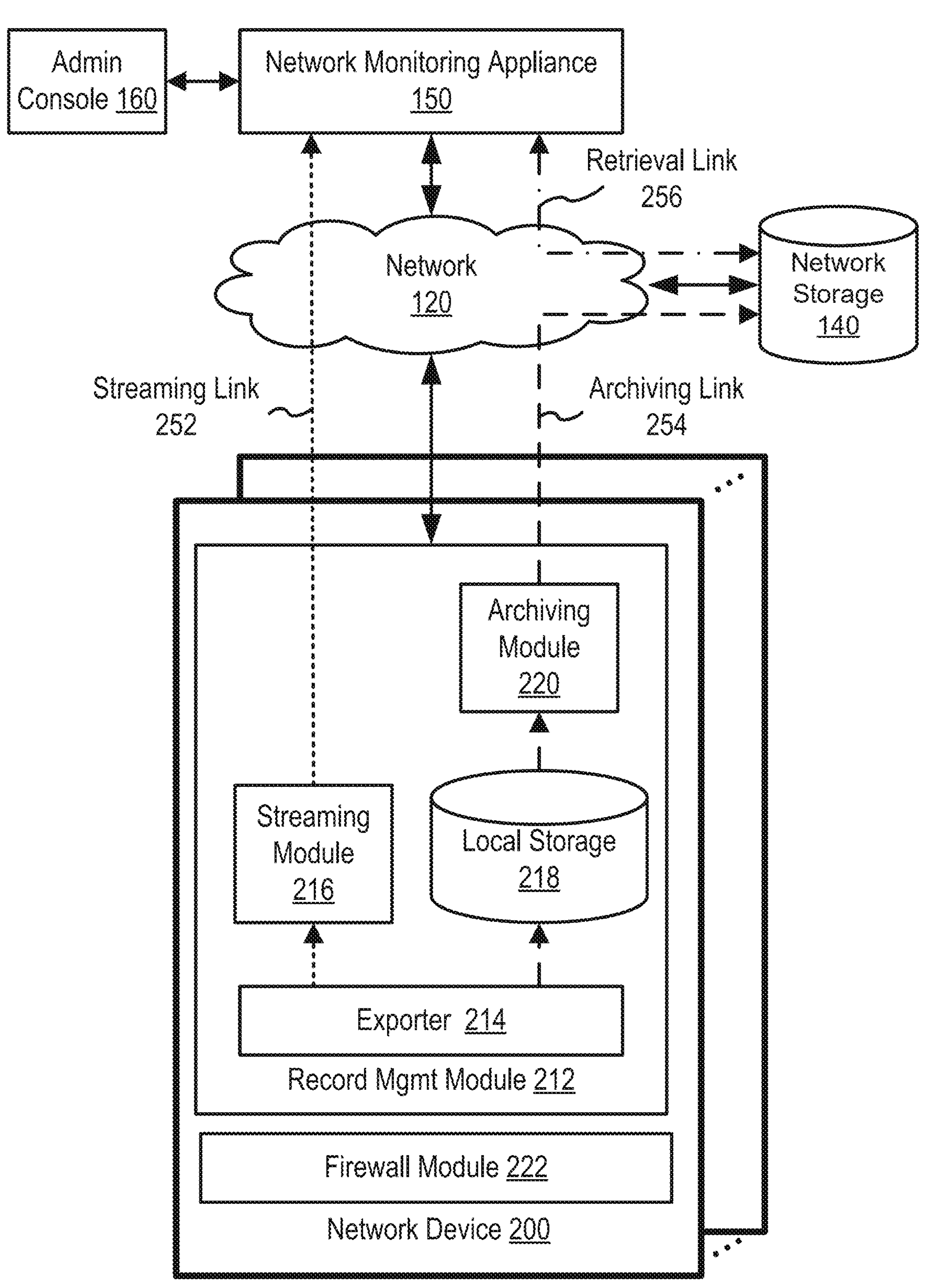
FIG. 2 illustrates an example of a network device that exports network flow information records according to an archiving mode and/or a streaming mode.

FIG. 2 is an example of a network device 200 that includes a firewall module 222 for applying firewall policy and a record management module 212 for generating and exporting network flow information records. The network device 200 may represent a ToR device 106, a firewall device 110, or any other network device. The firewall module 222 may apply various types of firewall policies depending on its device-specific configuration. For example, as explained above, a firewall module 222 for a ToR device 106 may perform more limited firewall functions than a firewall module 222 for a dedicated firewall device 110. The record management module 212 comprises an exporter 214, a streaming module 216, a local storage 218, and an archiving module 210.

The exporter 214 generates network flow information records from network traffic data received at the network device and exports network flow information records. The network flow information records may comprise organized summaries of network flow data, for example, the records may include the start of the flow and metadata about the flow, such as counters for the flow, that may be formatted in a standardized format. For example, the exporter 214 may generate IPFIX records, sFlow records, or other types of records associated with network flow information. The network flow information may include information relating to operation of the firewall module 222 such as policy rules applied, instances of traffic being allowed, blocked, or redirected, or other firewall-related information.

The local storage 218 locally stores network flow information records in a local file system. The local storage 218 may store the network flow information records at least as fast as they are generated by the exporter 214 such that data records are not lost. In an example implementation, the local storage 218 may comprise a mountable FLASH drive, although any type of storage may be used.

The archiving module 220 operates to transport network flow information records from the local storage 218 to the network storage 140 via the network 120. For example, the archiving module 220 may periodically perform batch uploads of network flow information records from the local storage 218 to the network storage 140 according to a fixed schedule (e.g., every few minutes or every few hours). Alternatively, the archiving module 220 may perform uploads after a predefined volume of data is added to the local storage 218 since the last upload. In further embodiments, the archiving module 220 may perform uploads as fast as network resource constraints allow, while using the local storage 218 as a local buffer whenever records are generated faster than they can be immediately offloaded to the network storage 140. In other implementations, the archiving module 220 may perform uploads when manually triggered by an administrator (e.g., via the administrative console 160) or based on automated detection of some network condition. Network flow records that have been archived to the network storage 140 may be removed from the local storage 218 or overwritten (for example, by allowing new network flow information records to overwrite the oldest records).

The streaming module 216, when enabled, streams the network flow information records via the network 120 to the network monitoring appliance 150. Streaming may be performed using any suitable transport protocol such as Transmission Control Protocol (TCP), User Datagram Protocol (UDP), or other streaming protocol. The streaming module 216 operates to prioritize low latency data availability at the network monitoring appliance 150, which may allow for some data loss. For example, if the exporter 214 generates records more quickly than the streaming module 216 can transfer and/or the network monitoring appliance 150 can ingest, the network flow information records may be dropped by the streaming module 216 (or by the network monitoring appliance 150). Alternatively, the streaming module 216 can instruct the exporter 214 to reduce the number of records and/or the volume of data in each record to ensure low latency transport. In such situations, data integrity of the streamed records may be sacrificed in favor of real-time or near-real time (e.g., less than a threshold latency) data availability (although integrity may be preserved through the archiving mode if concurrently enabled).

The streaming module 216 can be optionally enabled or disabled via a configurable setting. For example, the streaming module 216 may be enabled manually by an administrator-controlled setting (e.g., set via the administrative console 160) or may be enabled automatically under certain detected conditions. In further implementations, the streaming module 206 may be always on.

The streaming module 216 can furthermore be configurable to stream only certain types of network flow information records while bypassing other types of records. For example, the streaming module 216 may be configured to stream network flow information records associated with certain subnets, records associated with certain network protocols, or records limited by other specified filtering parameters and/or policy rules. Filtering parameters may be configured by the network monitoring appliance 150 (e.g., via a user interface of the administrative console 160 or via an automated setting). The record filtering could also be dynamically configured based on observed network conditions. For example, a streaming policy could reduce the types of network flow information records targeted for streaming depending on the current volume of network traffic, the number of dropped records, or other detected conditions.

FIG. 2 also illustrates the various logical communication pathways between the record management module 212, the network storage 140, and the network monitoring appliance 150. A streaming link 252 represents communication pathways under which the network flow records are streamed from the record management module 212 to the network monitoring appliance 150 (via the network 120). An archiving link 254 represents communication pathways under which the network flow records are initially stored to local storage 218, and subsequently archived to the network storage 140 by the archiving module 220 (via the network 120). A retrieval link 256 represents communication pathways under which the network monitoring appliance 150 may query and retrieve archived network flow information records from the network storage 140.

The network monitoring appliance 150 and the network storage 140 may be concurrently coupled to many such record management modules 212 associated with different network devices 200 (e.g., ToR devices 106, firewall devices 110, or other network devices) within a network environment 100.

Figure 3:
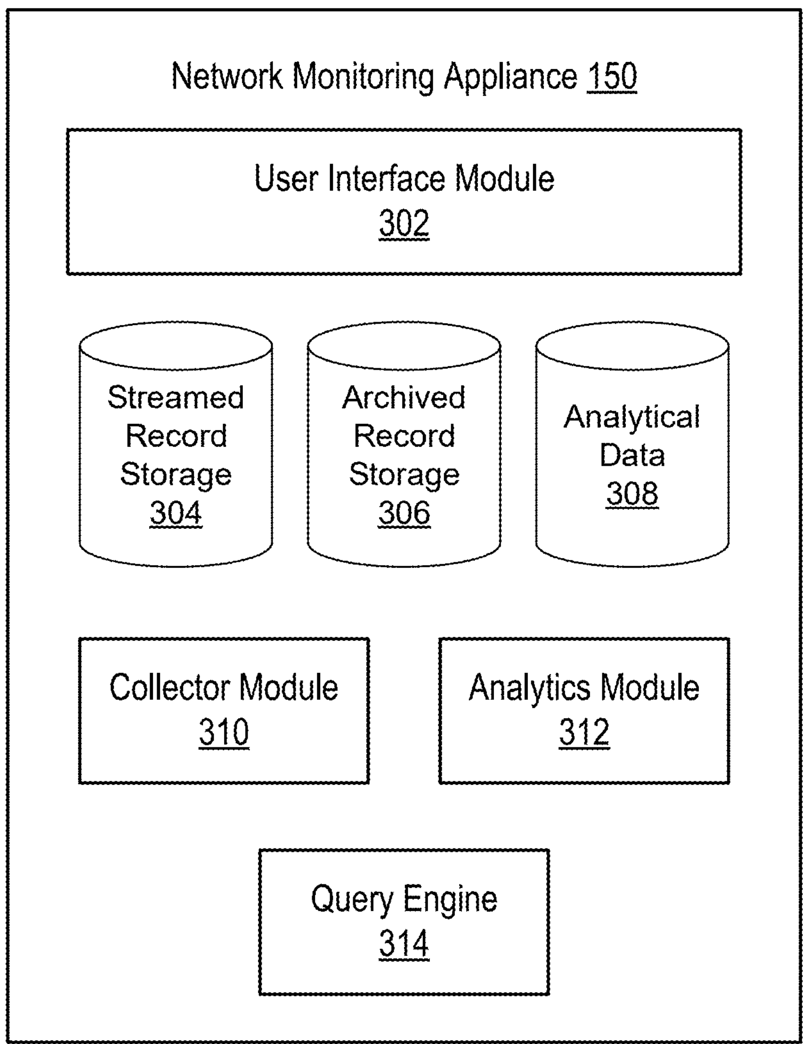
FIG. 3 illustrates an example of a network monitoring appliance for receiving streaming network flow information records from a network device and for obtaining archived network flow information records from a network storage.

FIG. 3 illustrates an example embodiment of a network monitoring appliance 150. The network monitoring appliance 150 may comprise a user interface module 302, a streamed record storage 304, an archived record storage 306, an analytical data store 308, a collector module 310, an analytics module 312, and a query engine 314. Alternative implementations may comprise different or additional components.

The collector module 310 collects the streamed network flow information records from one or more network devices 200. The collector module 310 may receive records over any suitable streaming protocol such as TCP or UDP. Depending on the protocol, the collector module 310 may drop records when it receives records faster than they can be processed, thereby prioritizing low latency availability of the records over data integrity. Alternatively, the collector module 310 may signal to the record management module 212 to reduce the rate of streaming of network flow information records. The streamed records may be locally stored to a streamed record storage 304.

The query engine 314 interfaces with the network storage 140 to retrieve archived records, which may be at least temporarily stored to a local archived record storage 306. The specific queries may include preconfigured rules (e.g., all records from last 30 days) or user-customized queries (e.g., set via administrative console 160) that may include various filters or other parameters.

The analytics module 312 may apply one or more analytical functions or heuristics to a set of data records to derive various analytical data relating to operation of an individual network device 200 and/or a set of devices 200 in a network environment 100. For example, analytical data may provide insights into performance, data integrity, security, or other characteristics of data center operation. The analytics module 312 may operate on data records in the archived record storage 306, the streamed record storage 304, and/or the network storage 140. Analytical data may be stored to the analytical data store 308. This analytical data may be subsequently queried to view historic analytical data and/or derive new analytical data.

The user interface module 302 may interoperate with the administrative application 162 to retrieve and present individual network flow information records, aggregations of network flow information records, and/or various analytical data derived from the network flow information records. The user interface module 302 may retrieve information from the streamed record storage 304, the archived records storage 306, the analytical data store 308, or directly from the network storage 140. The user interface module 302 may output information to allow the administrative application 162 to present the records individually or in various aggregated representations such as graphs, charts, timelines, etc. The user interface module 302 may furthermore respond to user inputs received via the administrative application 162 specifying desired filtering parameters that control which records are presented or included in an aggregated representation, and control what type of representations are shown.

The records in the local archived record storage 306 and the streamed record storage 304 may be subject to one or more retention policies that control how long, or under what conditions, records are maintained in the local storages 304, 306 or when they are discarded or overwritten. These retention policies may be configurable through the user interface module 302 or through other external configuration settings. Records in the network storage 140 may similarly be subject to a retention policy that can be configurable by the network monitoring appliance 150. For example, the network monitoring appliance 150 may set a retention policy that retains records locally for a relatively short period (e.g., 30 days) while retaining records in the network storage 140 for significantly longer (e.g., 12 months, 24 months, or longer).

Figure 4:
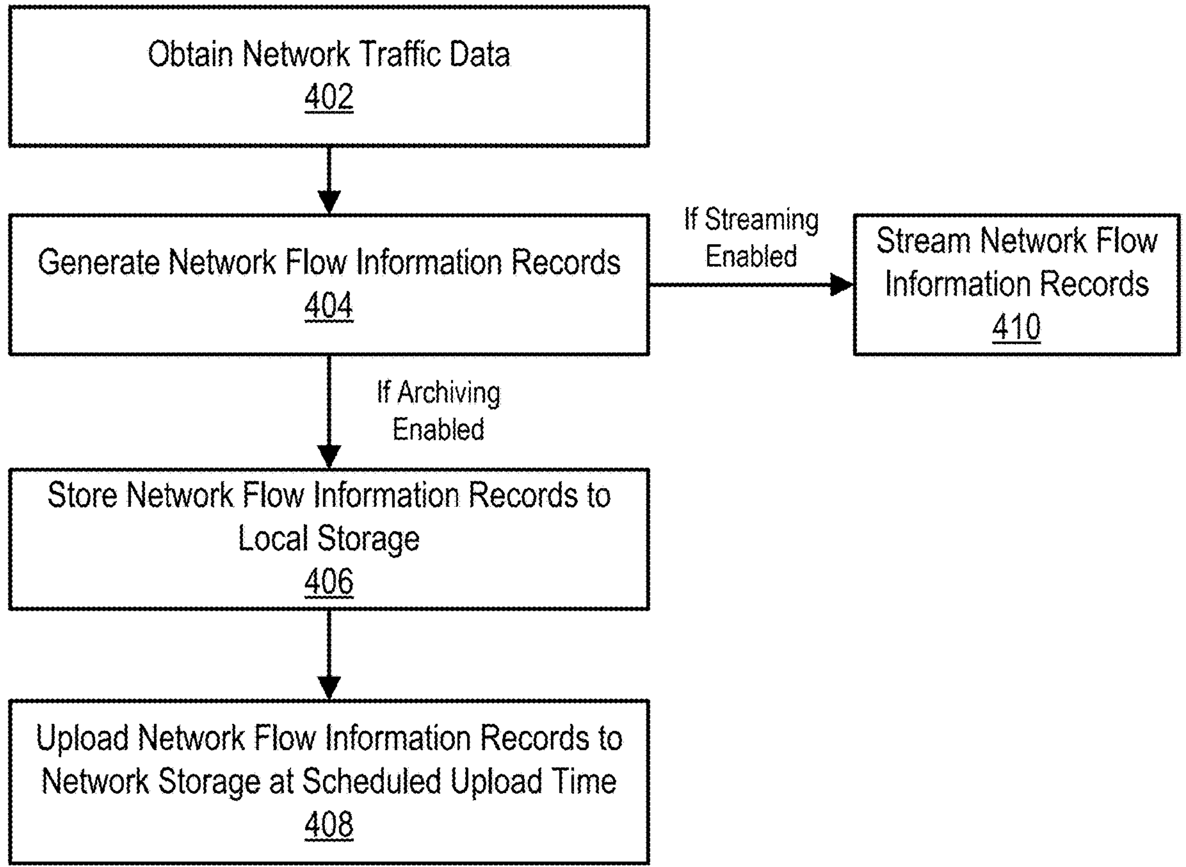
FIG. 4 is a flowchart illustrating an example process for operating a network device according to an archiving mode and/or a streaming mode.

FIG. 4 is a flowchart illustrating an example embodiment of a method executable in a network device 200 for exporting network flow information records. The network device 200 obtains 402 network traffic data sent to the network device 200. The network device 200 generates 404 network flow information records that characterize the network traffic data. If archiving is enabled, the network device 200 stores 406 the network flow information records to a local storage 218 of the network device 200. When a scheduled upload time is reached, the network device 200 uploads 408*a* set of the network flow information records over a network 120 to a remote network storage 140 for archiving to a database accessible to a network monitoring appliance 150. The network device 200 may continue obtaining 402, generating 404 and locally storing 406 network flow information records independently of the scheduled upload 408. For example, records may accumulate in the local storage before uploading 408. The records may then be uploaded 408 in batch on a periodic basis, when a specific volume of records are reached, or based on any other criteria.

The network device 200 may optionally enable a streaming mode of the network device 200. While the streaming mode is enabled, a streaming module 216 of the network device 200 streams 410 the network flow information records to the network monitoring appliance 150. Streaming may occur at a rate sufficient to enable real-time or near real-time availability of records at the network monitoring appliance 150. For example, records may be queued for streaming after each record is created. Under the streaming path, records may be dropped (or reduced in size) to prioritize availability over data integrity. As described above, the streaming mode may be enabled or disabled independently of the archiving mode.

While FIG. 4 illustrates logical operation of the steps, an actual implementation may include steps being performed in parallel for multiple instances of network flow information records and such steps may have varying and/or independent timing. For example, the steps of obtaining 402, generating 404, and storing 406 network flow information records may occur through multiple cycles (sequentially and/or in parallel) to generate multiple records prior to uploading 408. Additionally, multiple network flow information records could be generated 404 in parallel and then streamed 410 concurrently.

Figure 5:
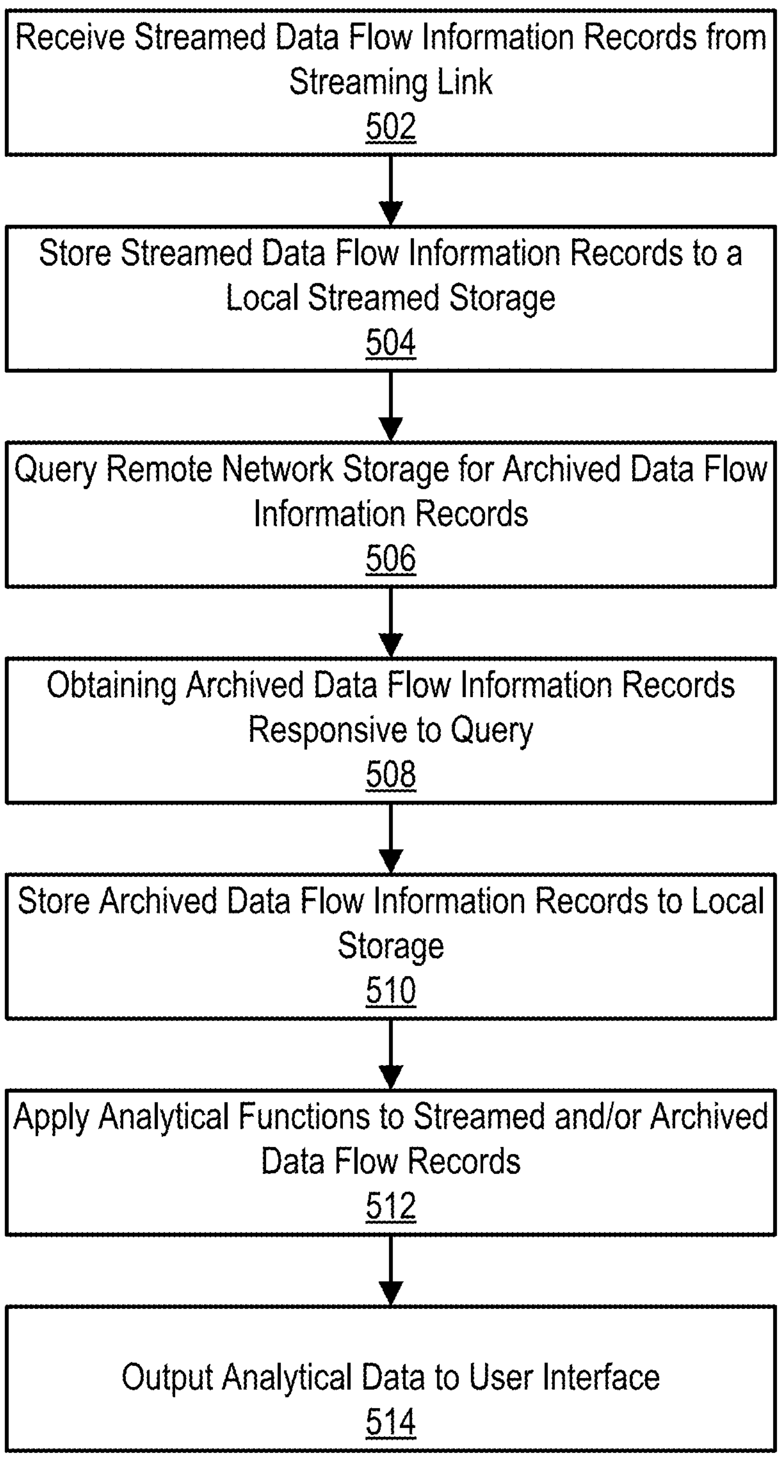
FIG. 5 is a flowchart illustrating an example process for operating a network monitoring appliance that receives streaming network flow information records and obtains archived network flow information records from a network storage.

FIG. 5 is a flowchart illustrating an example of a process for operating a network monitoring appliance 150. The network monitoring appliance 150 receives 502 streamed network flow information records from a network device 200 over a streaming link. The network monitoring appliance 150 stores 504 the streamed network flow information records to a local streamed record storage 304. The network monitoring appliance 150 also queries 506 a remote network storage 140 for archived network flow information records. The network monitoring appliance 150 obtains 508 the archived network flow information records responsive to the query and stores 510 the archived network flow information records to a local archived record storage 306. The network monitoring appliance 150 applies 512 one or more analytical functions to the streamed and/or archived network flow information records and outputs 514 analytical data to a user interface of an administrative application 162. For streamed records, the outputs may comprise a representation of the network flow information records presented in substantially real-time.

The network monitoring appliance 150 may optionally control the operating modes of one or more network devices 200 to enable or disable archiving to the network storage 140 and to enable or disable streaming to the network monitoring appliance 150 (e.g., based on a configuration setting obtained from an administrative console 160). The network monitoring appliance 150 can furthermore configure and deploy various streaming policies that control what types of network flow information records are streamed by the network devices 200 (e.g., enabling a streaming for a specific subnet).

The network monitoring appliance 150 may further control a retention policy associated with the streamed network flow information records and the archived network flow information records. Records may be discarded from the local storage 304, 306 or overwritten when a configured retention period is reached.

The above-described network device 200 (e.g., a firewall device 110, ToR device 106, or other device) beneficially enables preservation of network flow information records in a network storage 140 accessible to a network monitoring appliance 150 without data loss. Concurrently, the network device 200 can optionally stream some or all of the network flow information records to the network monitoring appliance 150 for situations where low latency data availability is a priority (e.g., debugging). The archiving modes and streaming modes may operate independently to enable long-term storage of network flow information records with high data integrity, while also allowing real-time monitoring and analytics when desired. The described architecture enables high scalability of network environments 100 managed by a network monitoring appliance 150 because data integrity can be preserved regardless of the number of network devices 200 and volume of data records generated.

Upon reading this disclosure, those of ordinary skill in the art will appreciate still alternative structural and functional designs and processes for the described embodiments, through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure herein without departing from the scope of the disclosure as defined in the appended claims.

What is claimed is:

1. A method executable in a network device for exporting network flow information, the method comprising:
 applying, by the network device, at least one firewall policy to network traffic data at the network device;
 generating, by the network device, network flow information records characterizing the network traffic data, wherein the network flow information records include information pertaining to the at least one firewall policy applied to the network traffic data;
 enabling an archiving mode of the network device;
 while the archiving mode is enabled, storing the network flow information records to a local storage of the network device;
 at a scheduled refresh time, uploading, using a network communication protocol, a set of the network flow information records over a network to a remote network storage external to the network device for archiving in a database accessible to a network monitoring appliance;
 enabling a streaming mode of the network device; and
 while the streaming mode is enabled, streaming over the network by a streaming module of the network device, the network flow information records to the network monitoring appliance, wherein the streaming module drops information if the network traffic data is received at a faster rate than a processing rate of the streaming module.

2. The method of claim 1, wherein the network device further overwrites the network flow information records in the local storage after archiving the network flow information records to the remote network storage.

3. The method of claim 1, wherein uploading the set of network flow information records occurs periodically according to a predefined schedule.

4. The method of claim 1, wherein the scheduled refresh time for uploading the set of network flow information records is triggered after a predefined volume of data is stored to the local storage.

5. The method of claim 1, wherein the network device comprises a firewall device.

6. The method of claim 1, wherein the network device comprises a top-of-rack (ToR) device that switches traffic to and from a plurality of host devices in a rack.

7. The method of claim 1, wherein the network flow information records comprise Internet Protocol Flow Information Export (IPFIX) records.

8. The method of claim 1, wherein the network flow information records comprise sampled flow (sFLOW) records.

9. A network device for exporting network flow information, the network device comprising:

a firewall module to apply at least one firewall policy to network traffic data;

a network flow information record generator configured to obtain network traffic data associated with the network device and to generate network flow information records characterizing the network traffic data, the network flow information records including information pertaining to the at least one firewall policy applied to the network traffic data;

a local storage to locally store the network flow information records;

an archiving module to operate in an archiving mode to upload using a network communication protocol, at a scheduled refresh time, a set of the network flow information records over a network to a remote network storage external to the network device that archives the network flow information records in a database accessible to a network monitoring appliance; and a streaming module configured to operate in a streaming mode stream over the network, the network flow information records to the network monitoring appliance, wherein the streaming module drops information if the network traffic data is received at a faster rate than a processing rate of the streaming module, wherein the streaming module is enabled concurrently with the archiving module.

10. The network device of claim 9, wherein the network device is configured to overwrite the network flow information records in the local storage after archiving the network flow information records to the remote network storage.

11. The network device of claim 9, wherein the network device is configured to upload the set of network flow information records periodically according to a predefined schedule.

12. The network device of claim 9, wherein the scheduled refresh time for uploading the set of network flow information records is triggered after a predefined volume of data is stored to the local storage.

13. A method for operating a network monitoring appliance, the method comprising:

receiving, by a collector module, streamed network flow information records from a streaming module of a network device over a network while a streaming mode of the network device is enabled, wherein the streaming module drops information if the network flow information records are created at a faster rate than a processing rate of the streaming module, wherein the network device applies at least one firewall policy to network traffic data at the network device prior to generating network flow information records for streaming, wherein the network flow information records include information pertaining to the at least one firewall policy applied to the network traffic data;

storing the streamed network flow information records to a local streamed record storage;

querying, a remote network storage for archived network flow information records;

obtaining the archived network flow information records over a network communication protocol responsive to the querying;

storing the archived network flow information records to a local archived record storage;

applying one or more analytical functions to the streamed network flow information records and the archived network flow information records to generate analytical data; and outputting the analytical data to a user interface of an administrative application coupled to the network monitoring appliance.

14. The method of claim 13, further comprising:

receiving a configuration setting to disable streaming of the streamed network flow information records; and sending a control signal to the network device to disable streaming.

15. The method of claim 13, further comprising:

receiving a configuration setting to enable streaming for a subset of network flow information records meeting a policy configuration; and sending a control signal to the network device to configure the network device to stream only the subset of the network flow information records meeting the policy configuration.

16. The method of claim 13, wherein outputting the analytical data comprises:

generating a representation of the streamed or archived network flow information records in substantially real-time for presenting in an administrative console.

17. The method of claim 13, further comprising:

obtaining a retention policy;

discarding or overwriting the streamed network flow information records from the local streamed records storage of the network monitoring appliance based on the retention policy; and discarding or overwriting the archived network flow information records from the local archived records storage of the network monitoring appliance based on the retention policy.

18. The method of claim 13, wherein the streamed network flow information records and the archived network flow information records are received from a plurality of different network devices operating within a network environment.

19. The method of claim 13, wherein the streamed network flow information records and the archived network flow information records include at least one of: information identifying the network device that applied the at least one firewall policy, information identifying the at least one firewall policy applied by the network device, and information indicating denials or redirects resulting from the at least one firewall policy.

20. The method of claim 13, wherein the streamed network flow information records and the archived network flow information records are obtained from at least one of a ToR device and a firewall device.

* * * * *